United States Patent
Huang et al.

(10) Patent No.: US 9,992,241 B1
(45) Date of Patent: Jun. 5, 2018

(54) UNIFIED COMMUNICATIONS FOR ONLINE COLLABORATION

(71) Applicant: Moxtra, Inc., Los Gatos, CA (US)

(72) Inventors: He Huang, San Jose, CA (US); Subrah S. Iyar, Los Gatos, CA (US)

(73) Assignee: Moxtra, Inc., Los Gatos, CA (US)

( * ) Notice: Subject to any disclaimer, the term of this patent is extended or adjusted under 35 U.S.C. 154(b) by 0 days. days.

(21) Appl. No.: 15/787,007

(22) Filed: Oct. 18, 2017

(51) Int. Cl.
*H04M 3/42* (2006.01)
*H04L 29/06* (2006.01)
*H04M 3/56* (2006.01)
*H04M 7/00* (2006.01)

(52) U.S. Cl.
CPC ...... *H04L 65/1073* (2013.01); *H04L 65/1093* (2013.01); *H04L 65/403* (2013.01); *H04M 3/563* (2013.01); *H04M 3/567* (2013.01); *H04M 7/0027* (2013.01); *H04M 2250/62* (2013.01)

(58) Field of Classification Search
CPC . H04M 2203/5063; H04M 2203/5009; H04M 2203/50; H04M 3/56

USPC ........... 379/204.01, 201.01, 202.01, 203.01, 379/207.15, 207.13, 207.02; 39/201.02
See application file for complete search history.

(56) References Cited

U.S. PATENT DOCUMENTS

| | | | |
|---|---|---|---|
| 2007/0160035 A1* | 7/2007 | Altberg | H04L 12/1813 370/352 |
| 2015/0200974 A1* | 7/2015 | Pearce | H04L 43/08 709/203 |

* cited by examiner

*Primary Examiner* — Thjuan K Addy
(74) *Attorney, Agent, or Firm* — WHS Law Firm (57) ABSTRACT

Technology is disclosed for a unified communications service (UCS) that converts an audio call to an online collaboration session where users collaborate using one or more collaboration services while continuing to converse on the audio call without interruption (the "technology"). The technology enables two or more users, who are engaged in a voice conversation, to start a collaboration service. Collaboration service includes such services as, e.g., file sharing, screen sharing, video conferencing, and whiteboarding. These collaboration services are started without disconnecting the ongoing audio call, and/or leaving any user interface used for that call.

5 Claims, 10 Drawing Sheets

UNIFIED COMMUNICATIONS FOR ONLINE COLLABORATION

FIELD OF THE DISCLOSURE

The disclosure relates to electronic communications and collaboration, and more specifically to the integration of audio communication and online collaboration systems.

BACKGROUND

Unified communications is an integration of non-real-time communication services, such as integrated voicemail, e-mail, SMS and fax (or unified messaging) with real-time enterprise communication services, such as voice, instant messaging, audio, web and videoconferencing, mobility features, fixed-mobile convergence, desktop sharing, data sharing, call control and speech recognition. Current unified communications services provide various services, such as the ones described above, for users to collaborate. However, some of the current unified communications services do not provide a convenient way for users to collaborate efficiently. For example, current services do not provide a way to transition phone calls between users into online collaboration sessions for performing collaboration activities such as file sharing, screen sharing, video conferencing and whiteboarding.

SUMMARY

Technology is disclosed for a unified communications service (UCS) that converts an audio call to an online collaboration session where users collaborate using one or more collaboration services while continuing to converse on the audio call without interruption (the "technology"). The technology enables two or more users, who are engaged in a voice conversation, to start a collaboration service. Collaboration service includes such services as, e.g., file sharing, screen sharing, video conferencing and whiteboarding. These collaboration services are started without disconnecting the ongoing audio call, and/or leaving any user interface used for that call.

For example, in one embodiment, consider that a pair of users are participating in an audio call. The audio call was initiated and accepted by the users using a UCS app on their respective devices. If one of the users intends to initiate a collaboration service (e.g., a screen sharing), that user initiates screen sharing by simply pushing a button in the app. In that way, the user shares her screen from within the app and without disconnecting the audio call. The app will seamlessly unify an audio call with an online collaboration session to provide a unified communications service.

In some embodiments, the technology also enables the users to share a file within the unified collaboration session. The file can be an online binder. In various embodiments, the technology stores multiple data files that are received in multiple formats from multiple sources as pages of the online binder. The pages of the online binder are of a common format. The common format allows the pages, that is, the data files corresponding to the pages, to be displayed on or accessed using a variety of devices regardless of a platform of the devices. For example, a page of the online binder corresponding to a Microsoft Word document file can be accessed using devices such as a desktop, a laptop, a smart phone, or a tablet PC regardless of the operating system running on these devices, and regardless of whether the devices have Microsoft Word software installed on them.

In some embodiments, the online binder and the pages of the online binder can be accessed using a web browser installed on a device.

In some embodiments, the technology provides a "whiteboard" collaboration service that enables the users to start a whiteboarding session from their user devices in which a user can share a whiteboard from his/her user device with other users. UCS helps the users, e.g., who are in an audio call, in seamlessly transitioning from the audio call to an online collaboration session in which the users can share the whiteboard on their devices in addition to conversing on the voice call. A user can perform a number of actions on the whiteboard such as, e.g., type text, draw figures and insert images, all of which will be displayed to the other users in the online collaboration session on their respective devices.

In some embodiments, the technology provides a video call service that enables the users conversing in an audio call to transition to a video call in which the users can video conference. The UCS seamlessly transitions from the audio call to an online collaboration session in which multiple users video conference.

BRIEF DESCRIPTION OF THE DRAWINGS

The drawings described herein are for illustrative purposes only of selected embodiments and not all possible implementations and are not intended to limit the scope of the present disclosure.

DEFINITIONS

Online Collaboration Session: a joint session of users where actions of each participating user, such as generating audio and/or video input, sharing a file or annotating a shared document, are presented to the screens of the devices of the other participating users in real-time.

Phone Registry: a registry of telephonic devices associated with a user of UCS whether or not those devices are UCS-enabled. A user's telephonic devices may be registered with attributes, and corresponding values, such as Session Initiation Protocol ("SIP") host and proxy addresses, SIP username, password and extensions, and an assigned, public phone number. Users may also register multiple devices to the same extension so that all devices receive outgoing calls made to that extension.

Softphone: a device running an application program that enables that device to make and receive phone calls without hardware dedicated to that function. Softphones commonly make and receive Voice over Internet Protocol (VoIP) telephone calls.

Telephonic Device: any device capable of making an audio call and/or a video call. Telephonic devices include traditional telephones, mobile (cellular) phones, smartphones, softphones, desktop computers, laptop computers and wearable devices.

USC-Enabled Device: a computing device that is capable of making an audio call, making a video call, and/or exchanging data between a pair of computing devices, in which the unified communications service (UCS) is implemented. A computing device may be a desktop computer, a laptop computer, a tablet PC, a smartphone, a softphone or a wearable device. UCS may be implemented as an app in a computing device.

DETAILED DESCRIPTION

Environment for Unified Communications Service

Figure 1:
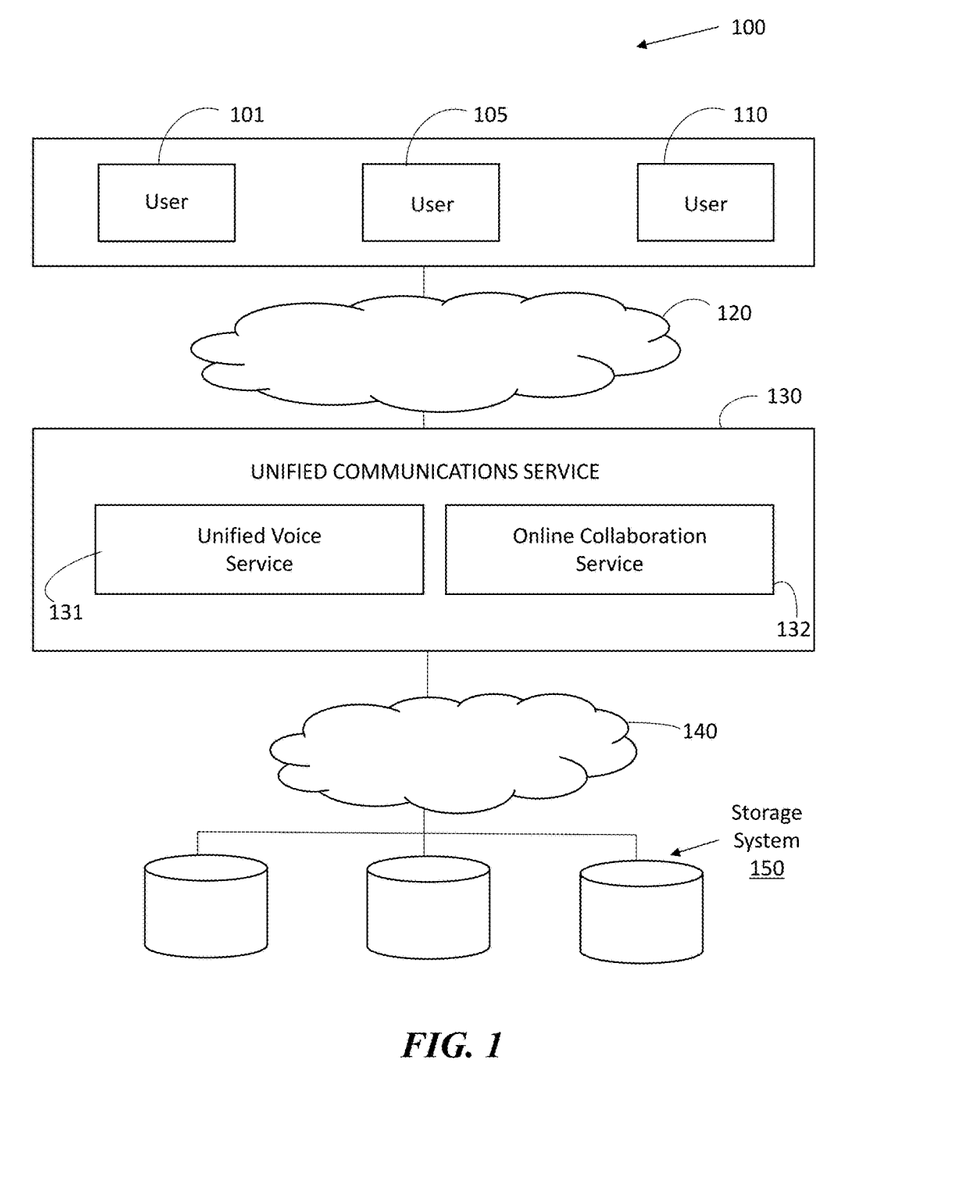
FIG. 1 is a block diagram illustrating an environment in which the technology may operate in various embodiments.

Technology is disclosed for providing unified communications service ("UCS") for online collaboration (the "technology"). Several embodiments of the technology are described in more detail in reference to the figures. Turning to FIG. 1, FIG. 1 is a block diagram illustrating an environment 100 in which the technology may operate in various embodiments. The environment 100 includes a unified communications service 125 that provides a set of services, including services such as a unified voice service 130 and an online collaboration service 140 to a set of users, e.g., user 101, user 105 and user 110. The set of users may access the unified communications service 125 via a communication network 120 supporting the wide variety of telephony options, such as, e.g., traditional telephones, mobile phones, office phone exchanges and Internet-based phones. Further, the set of users may access the unified communications service 125 using a variety of devices, including a desktop, a laptop, a smart phone, or a tablet PC.

In various embodiments, the unified communications services 125 makes calls, receives calls, and joins callers in online collaboration sessions for a set of users, such as users 101, 105 and 110. The unified voice service 130 allows users to make and/or receive phone calls from registered, UCS-enabled devices. The online collaboration service 140 allows users to join online collaboration sessions, which are joint sessions of users where actions of each participating user, such as generating audio/video input, sharing a file or annotating a shared document, is presented to the screens of the devices of the other participating users in real-time. In some embodiments, the set of users may access the unified communications service 125 using a web browser installed on a device. Further details regarding making calls, receiving calls, and joining callers are described with reference to at least FIGS. 2 and 7-10.

Unified communications service 125 may be implemented in a variety of configurations. One typical configuration may include an online configuration in which unified communications service 125 is implemented in a distributed network, for example, LAN, WAN, or Internet. The users access unified communications service 125 over a communication network such as network 120. Network 120 includes, consistent with various embodiments, technologies supporting public switched telephone network ("PSTN"), Code Division Multiple Access ("CDMA") and/or Global System for Mobile ("GSM") cellular networks, private branch exchange ("PBX") systems and Voice over Internet Protocol ("VoIP"), including Session Initiation Protocol ("SIP"). In various embodiments, unified communications service 125 may also be implemented in server client configuration in which an application corresponding to the client portion may be installed on the device of the user. The users may access unified communications service 125 using a web browser or a unified communications service application (also referred to as "UCS app" or "app") installed on the device of the user.

Unified Communications Service

Figure 2:
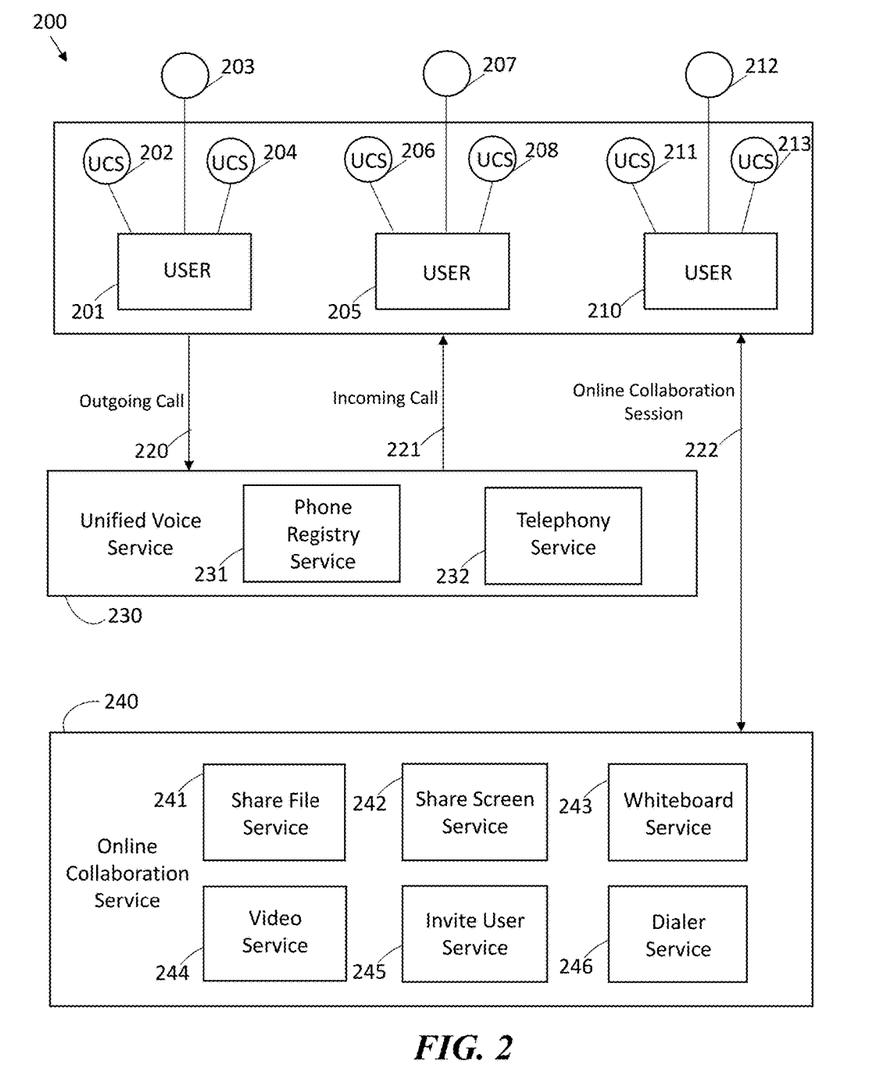
FIG. 2 is a block diagram illustrating an environment for providing unified communications service message a unified voice service and an online collaboration service, consistent with various embodiments.

Turning now to FIG. 2, FIG. 2 is a block diagram, consistent with various embodiments, illustrating an environment 200 for the unified communications service of FIG. 1. Unified voice service service 230 of environment 200 may be similar to unified voice service 130 of FIG. 1. Online collaboration service 240 of environment 200 may be similar to online collaboration service 140 of FIG. 1. Users 201, 205 and 210 of environment 200 may be similar to users 101, 105 and 110 of FIG. 1.

UCS may be implemented in any computing device that is capable of making an audio call, making a video call, and/or exchanging data between a pair of computing devices. Such devices are referred to as UCS-enabled devices. For example, the computing device may be a desktop computer, a laptop computer, a tablet PC, a smartphone or a wearable device. In some embodiments, UCS can be implemented as an app in the computing device. The app has the capability to make an audio and/or a video call, to join online collaboration sessions, and to execute one or more collaboration services, e.g., file sharing, screen sharing, video conferencing and whiteboarding.

Users, such as users 201, 205 and 210, may have various devices with telephonic capabilities, such as, e.g., traditional phones, mobile phones, smartphones, and devices, such as smartphones and laptops, running softphone applications, consistent with various embodiments. Users' telephonic devices may or may not be UCS-enabled. That is to say, a particular device may or may not have a UCS app installed on it. User 201 has three devices with telephonic capabilities (devices 202, 203 and 204). Devices 202 and 204 are UCS-enabled. Device 203 is not. User 205 has three devices with telephonic capabilities (devices 206, 207 and 208). Devices 206 and 208 are UCS-enabled. Device 207 is not. User 210 has three devices with telephonic capabilities (devices 211, 212 and 213). Devices 211 and 213 are UCS-enabled. Device 212 is not.

Phone registry service 231 allows users, such as users 201, 210 and 215, to register their telephonic devices with UCS whether or not those devices are UCS-enabled, consistent with various embodiments. For example, a user may register a device with a softphone application. This device may be registered with attributes, and corresponding values, such as Session Initiation Protocol ("SIP") host and proxy addresses, SIP username, password and extensions, and an assigned, public phone number. In some embodiments, users may register multiple devices to the same extension so that all devices receive outgoing calls made to that extension.

User 201, for example, may register the phone number, +1 (123) 843-3869, to devices 202, 203 and 204. If User 205 made a call to phone number, +1 (123) 843-3869, telephony service 232 would direct that outgoing call to all three devises of User 201 registered to that number. Telephony service 232 makes outgoing calls 220 from UCS-enabled devices, and receives incoming calls 221 on UCS-enabled devices.

Online collaboration service 240, consistent with various embodiments, establishes an online collaboration session 222 between 2 or more users. Once a session is established, online collaboration service 240 allows users in that session to perform a variety of collaboration services within the session. Share file service 241 enables users to share data files with other users in the session. Users may share data file of multiple formats, such as, e.g., Microsoft Corporation's Word format, Microsoft Corporation's Excel® format, Microsoft Corporation's PowerPoint® format, Joint Photographic Experts Group (.jpg) format, Adobe Systems Incorporated's portable document (.pdf) format, Apple Inc.'s QuickTime® (.mov) format, Apple Inc.'s Keynote® format, graphics interchange (.gif) format, bitmap (.bpm) format, and Microsoft Corporation's text (.txt) format.

In some embodiments, whiteboard service 243 enables users to whiteboard within the online collaboration session. Users may annotate shared files as on a physical whiteboard, and share those annotations in real time with other users in the session. Users may type text and draw figures on, and insert images in, the whiteboard, all of which will be displayed to the other users in the online collaboration session on their respective UCS-enabled devices.

Share screen service 242, consistent with various embodiments, enables users to share the current screen displayed on their device to other users within the online collaboration session. Video service 244 enables a user to transition from audio-only participation in the online collaboration session to video conferencing. Live video from their UCS-enabled device will be displayed to the other users in the session. Invite user service 245 enables users to invite (via, e.g., UCS app notification, chat message and/or email) additional users to join the online collaboration session. Dialer service 246 enables users to make calls from within the online collaboration session, and join the user who accepts the call.

Unified voice service, such as unified voice service 230, and online collaboration service, such as online collaboration service 240, may be accessed using a variety of devices, including a desktop computer, a laptop computer, a smartphone, or a tablet PC. They may also be accessed using a web browser installed on user devices. Further, the uniform communications services environment is 200 is platform agnostic, that is, users may make outgoing calls, such as outgoing call 220, receive incoming calls, such as incoming call 221, and may join online collaboration sessions, such as online collaboration session 222, from devices running on operating systems, such as Microsoft Corporation's Windows, Apple Inc.'s macOS® and iOS®, Google Inc.'s Chrome OS™ operating systems, and various implementations of the Android OS operating system.

Figure 3:
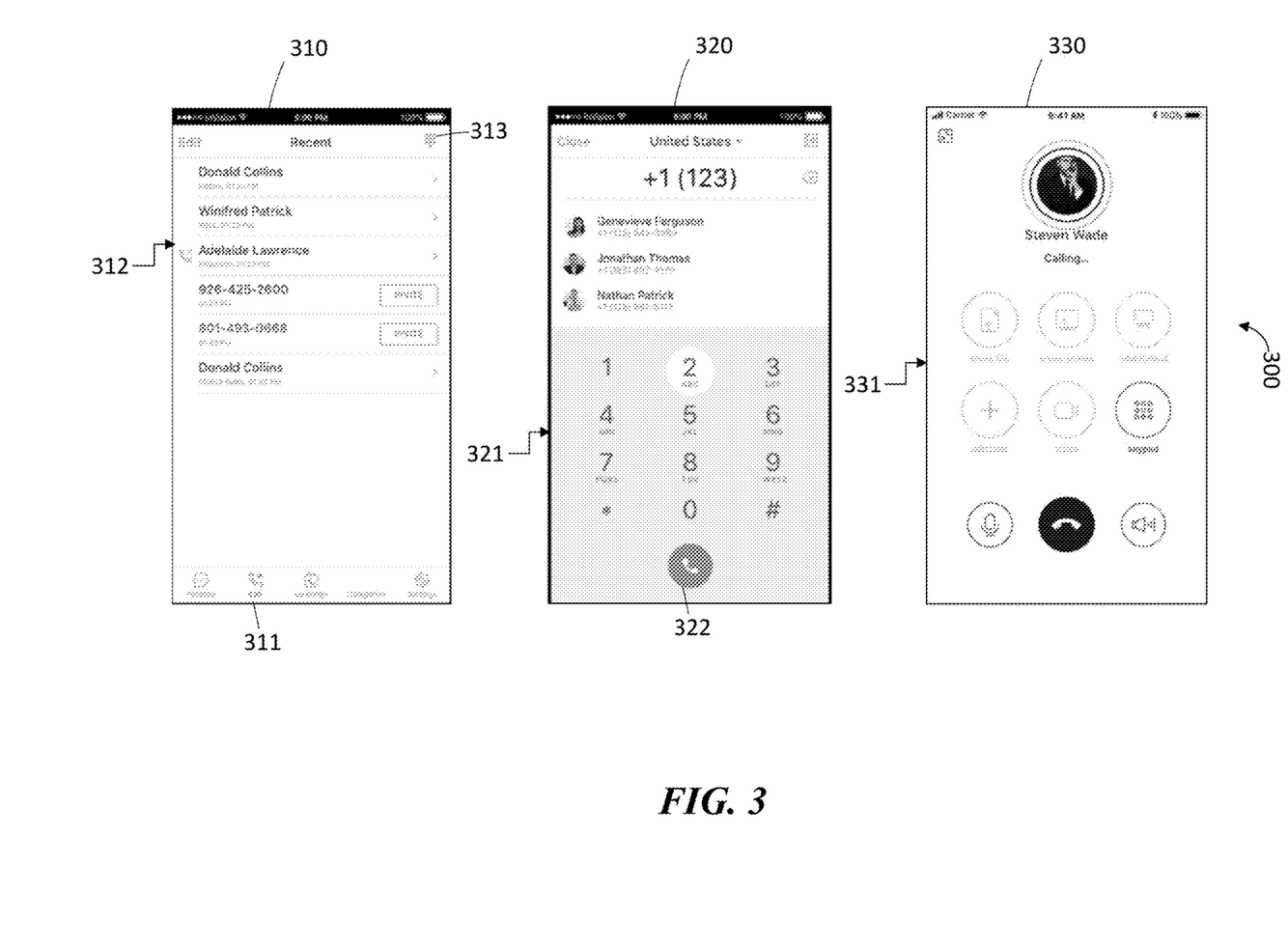
FIG. 3 is a series of exemplar screen shots from a UCS-enabled device of a user of FIG. 2, which show an outgoing UCS-audio call being made, consistent with various embodiments.

Turning now to FIG. 3, FIG. 3 is a series of exemplar screen shots 300 from a UCS-enabled device of a user of FIG. 2, which show an outgoing UCS-audio call being made, consistent with various embodiments. Screen shots 310, 320 and 330 may be similar to screen shots taken from UCS-enabled device 202 of user 201 of FIG. 2. A user, e.g., a first user, can select another user, e.g., a second user, to call in various ways, e.g., from an address book, from a favorites list, from a recently called list, or by keying the telephone number of the second user in the softphone directly. A first user may press a call icon button 311 to navigate to a UCS app graphical user interface (GUI) that displays recent phone calls made by that user 312. The user may then press a dial pad icon button 313 to display a dial pad 321 to enter a phone number. The UCS app includes a softphone dialer that allows users to make UCS-audio calls which make, e.g., PBX voice calls using VoIP and/or initiate requests for audio-based online collaboration. For example, after entering a phone number using dial pad 321, a first user may press the call button icon 322 to make the call. After pressing the call button, an online collaboration session (audio) screen, such as screen 330, may be shown where the first user is waiting for the second user to answer. In some embodiments, the UCS app displays options for various, potentially-available, online collaboration services 331 (e.g., "Whiteboard", "Share Screen", "Share Files", "Invite" and "Video") on the online collaboration session (audio) screen 330.

The online collaborations services may be 'available' because the UCS-audio call initiates a request for an audio-based, online collaboration session. The services are only 'potentially available' because the call has not yet been answered, and has not yet been answered by a UCS-enabled device, which would be capable of accepting a collaboration request. In this example, a user has called another user ("Steven Wade") and is waiting for an answer. The options for online collaboration services 331 are displayed in a gray font to indicate their current unavailability.

Figure 4:
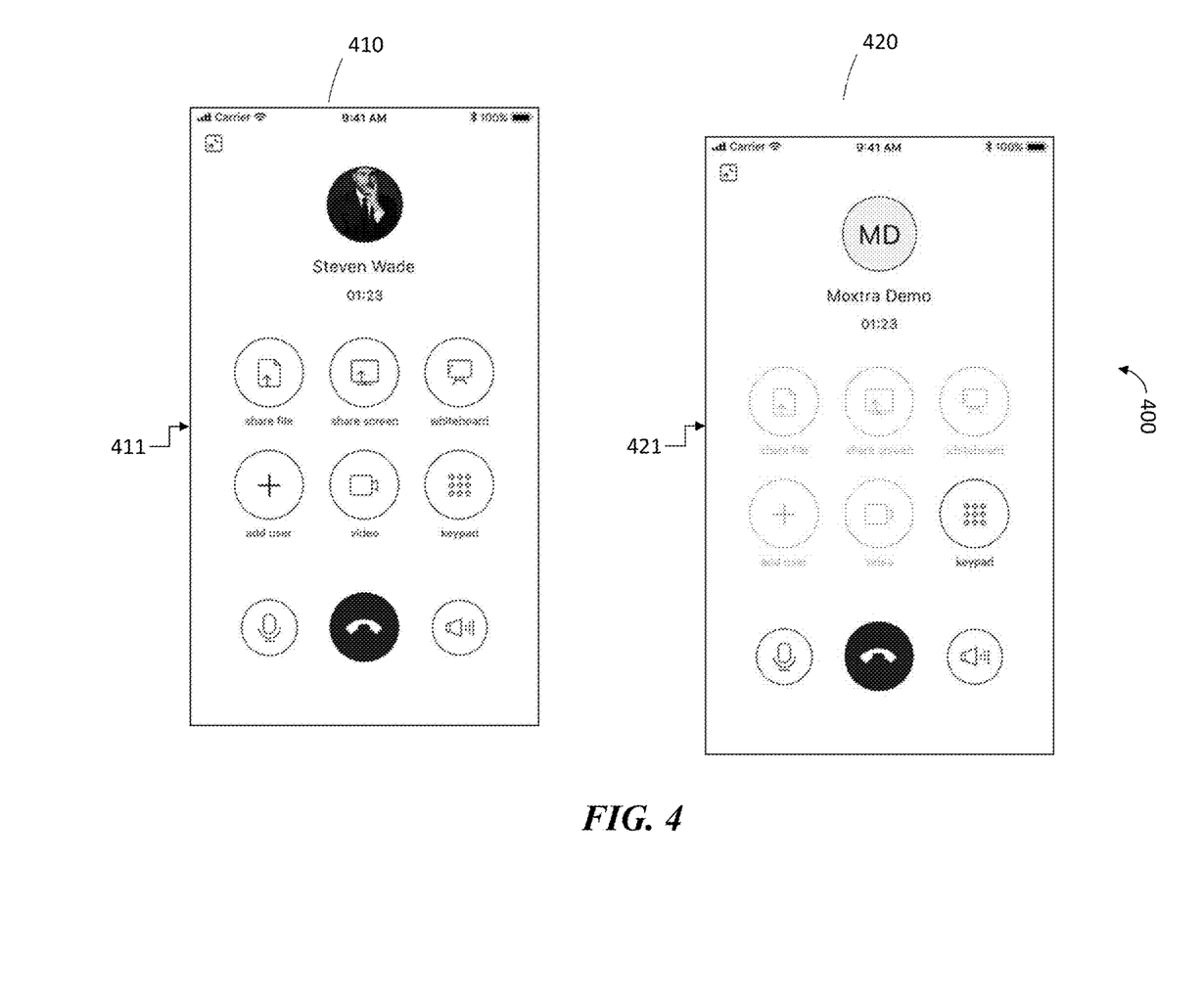
FIG. 4 is a series of exemplar screen shots from a device of a user of FIG. 2, which show an outgoing call in progress, consistent with various embodiments.

Turning now to FIG. 4, FIG. 4 is a series of exemplar screen shots 400 from a UCS-enabled device of a user of FIG. 2, which show an outgoing call in progress, consistent with various embodiments. Screen shots 410 and 420 may be similar to screen shots taken from UCS-enabled device 202 of user 201 of FIG. 2. Screen shot 410, in this example, is a screenshot of a first user's device who made a UCS-audio call to a second user ("Steven Wade") and that second user answered the call from his UCS-enabled device. Therefore, options for online collaboration services 411 (e.g., "Whiteboard", "Share Screen", "Share Files", "Invite" and "Video") are displayed in a black font to indicate that they are now available to first user. First user and second user are now in an audio-based, online collaboration session, consistent with various embodiments.

Screen shot 420, in this example, is a screenshot of a first user's UCS-enabled device who made a UCS-audio call to a second user ("Demo Moxtra") and second user has answered the call from a device that is not UCS-enabled. Therefore, options for online collaboration services 421 (e.g., "Whiteboard", "Share Screen", "Share Files", "Invite" and "Video") remain displayed in a gray font to indicate their current unavailability. First user and second user are now in an audio call, such as a PBX voice call using VoIP, consistent with various embodiments.

Receiving Incoming Calls

Figure 5:
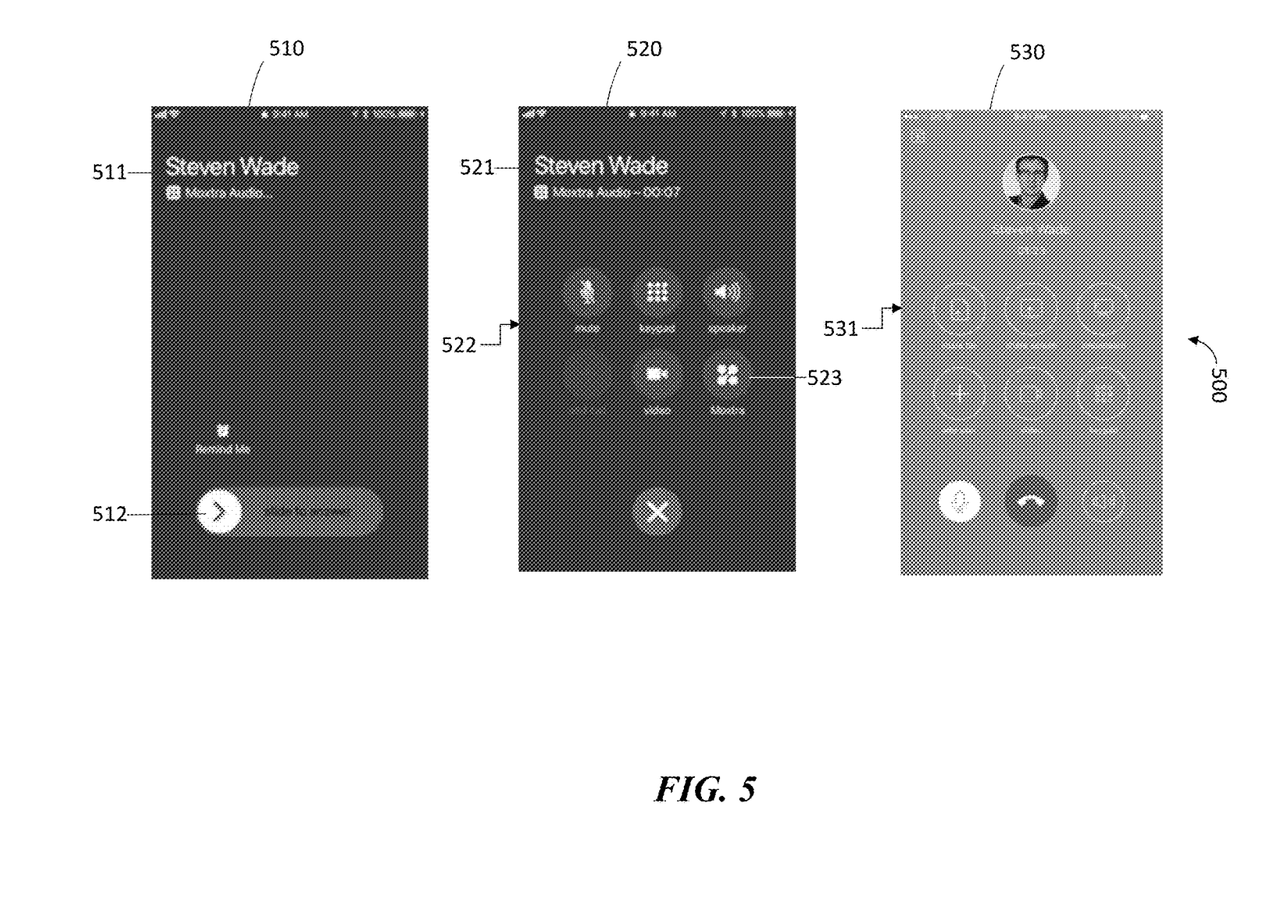
FIG. 5 is a series of exemplar screen shots from a device of a user of FIG. 2, which show an incoming call being received, answered, and transitioned to an online collaboration session, consistent with various embodiments.

Turning now to FIG. 5, FIG. 5 is a series of exemplar screen shots 500 from a device of a user of FIG. 2, which show an incoming call being received, answered, and transitioned to an online collaboration session, consistent with various embodiments. Screen shots 510, 520 and 530 may be similar to screen shots taken from device 206 of user 205 of FIG. 2.

In this example, a first user 511 ("Steven Wade") made a UCS-audio call to a second user's UCS-enabled device. In screen shot 510, the UCS app is presenting second user with notification of the UCS-audio call and the option to answer the call 512. After second user slides the answer bar 512, second user is now in a UCS-audio call with first user. In some embodiments, the UCS app displays a USC-audio call screen 520 on second user's device. This screen may have standard audio call options, such as, e.g., "mute", "keypad" and "speaker". The USC-audio call screen may also have an option 523 ("Moxtra") to transition second user to an online collaboration (audio) screen 530.

By answering the UCS-audio call on her UCS-enabled device, second user joined an audio-based, collaboration session with first user ("Steven Wade"). By pressing the "Moxtra" button 523, second user is presented with an online collaboration (audio) screen 530, where options for online collaboration services 411 (e.g., "Whiteboard", "Share Screen", "Share Files", "Invite" and "Video") are displayed in a white font to indicate that they are now available to second user. First user ("Steven Wade") is concurrently presented with a similar online collaboration (audio) screen—just as first user was presented with screen 410 and in FIG. 4. Second user and first user ("Steven Wade") are now collaborating in an audio-based, online collaboration session.

Figure 6:
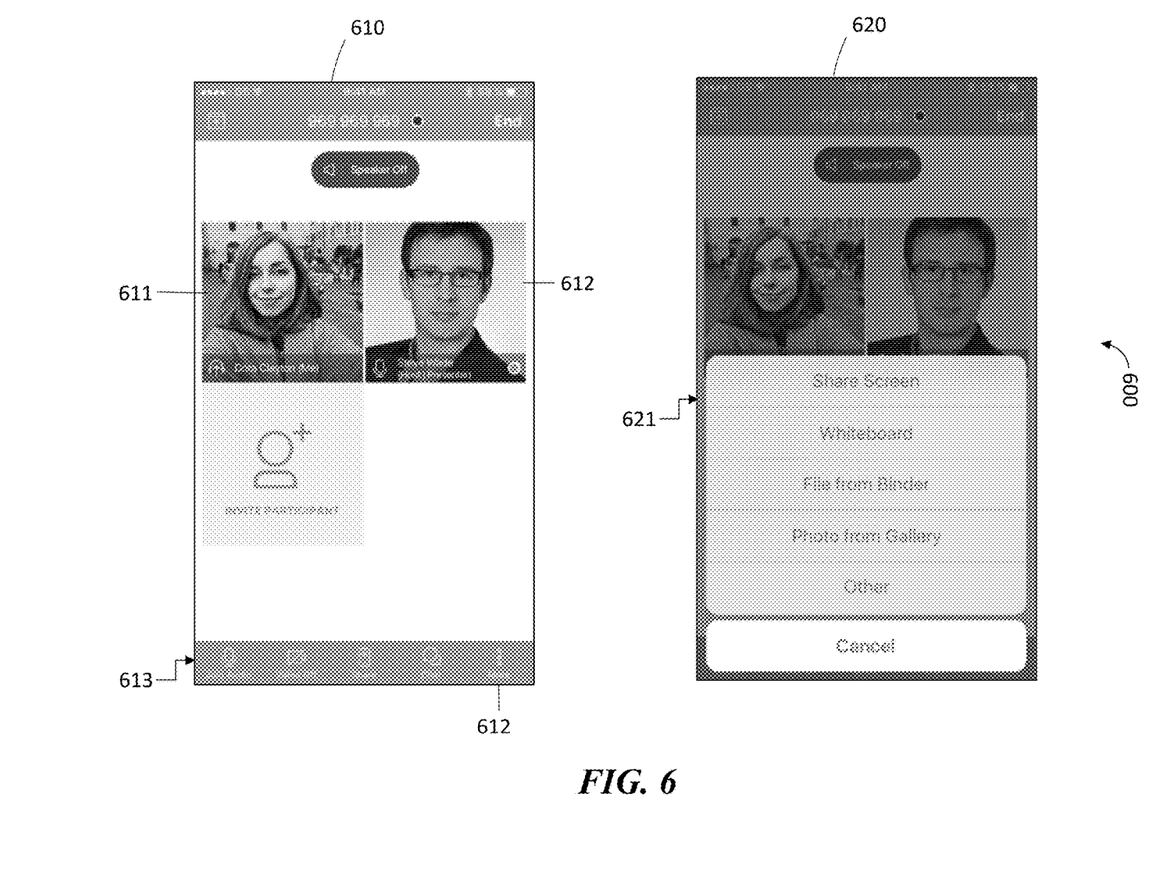
FIG. 6 is a series of exemplar screen shots from a device of a user of FIG. 2, which show an online collaboration session in progress, consistent with various embodiments.

Turning now to FIG. 6, FIG. 6 is a series of exemplar screen shots 600 from a device of a user of FIG. 2, which show an online collaboration session in progress, consistent with various embodiments. Screen shots 610 and 620 may be similar to screen shots taken from device 206 of user 205 of FIG. 2.

In this example, a first user 612 ("Steve Wade", the "Host Presenter") made a UCS-audio call to the UCS-enabled device of a second user 611 ("Dora Clayton"). Second user 611 answered the call and thereby joined an online collaboration session with first user 612. Second user is presented with an online collaboration session screen 610, which has collaboration services icons 613 for "Join Audio" "Video On/Off", "Share", "Chat" and "More". By pressing the "More" icon 612, second user is presented with a pop list of more collaboration services, such as "Share Screen", "Whiteboard", "File from Binder", "Photo from Gallery" and "Other".

In this way, UCS integrates unified voice services with online collaboration services. This integration allows for UCS users to seamlessly transition phone calls to collaboration sessions.

Example System for Unified Communications Service

Figure 7:
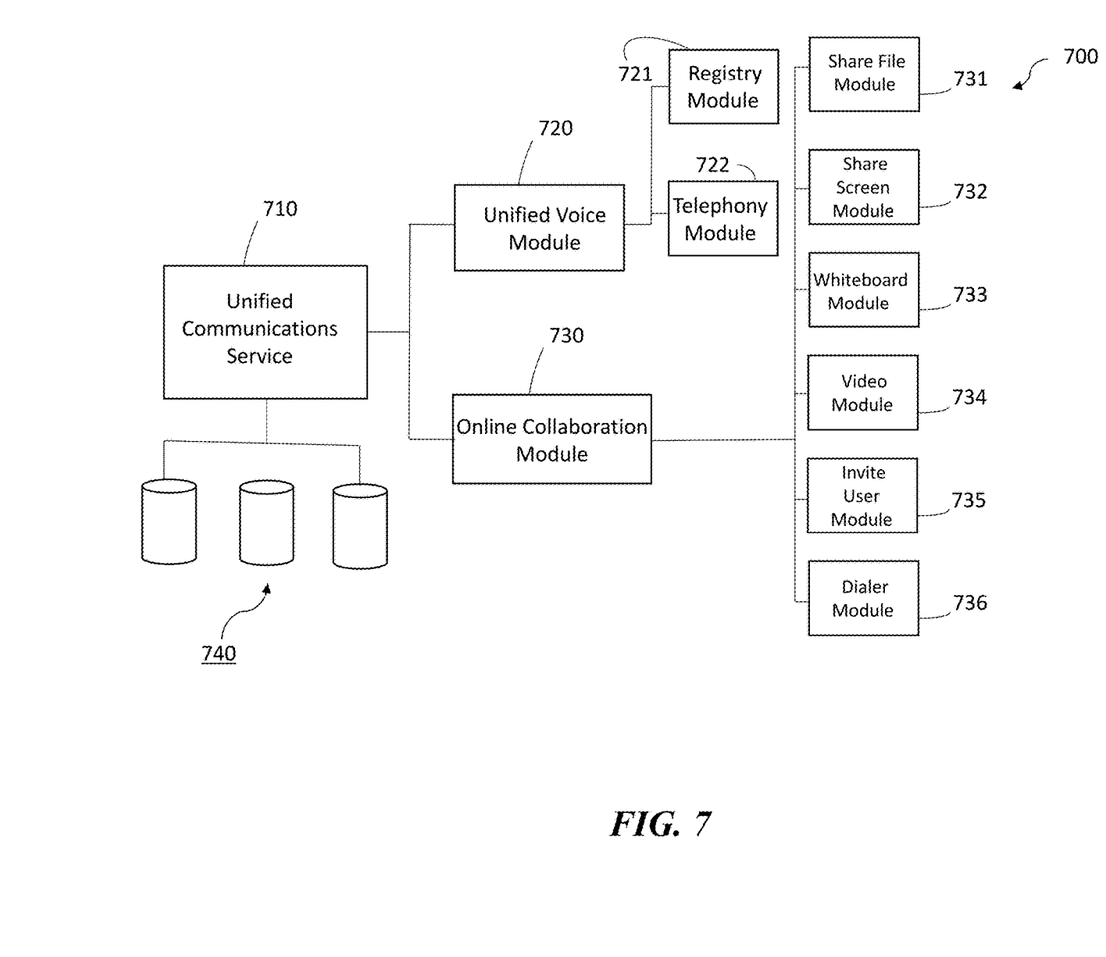
FIG. 7 is a block diagram of a system for a unified communications service of FIG. 1, consistent with various embodiments.

Turning now to FIG. 7, FIG. 7 is a block diagram of a system for a unified communications service of FIG. 1, consistent with various embodiments.

In various embodiments, system 700 is implemented to perform functions such as the functions of environment 100. In various embodiments, unified communications service 710 may be similar to the unified communications service 125 of FIG. 1. Unified communications service 720 includes various modules that provide services including unified voices services and online collaboration services.

Unified communications service 710 includes unified voice module 720 and online collaboration module 730. In various embodiments, unified voice module 720 may be similar to unified voice service 130. Unified voice module 720 includes registry module 721 that facilitates the user to create and maintain registrations for their telephonic devices, including traditional phones, mobile phones, smartphones, desktop computers, laptop computers and tablet PCs. Telephony module 722 facilitates the user to make and receive calls from their telephonic devices.

In various embodiments, online collaboration module 730 may be similar to online collaboration service 140 of FIG. 1. Online collaboration module 730 includes modules to perform online collaboration services. These modules may be similar to the online collaboration services of FIG. 2. Share file module 731 may be similar to share file service 241 of FIG. 2. Share file module 731 facilitates the user to share data files of various types with other users in an online collaboration session. Share screen module 732 may be similar to share screen service 242 of FIG. 2. Share screen module 732 facilitates the user to share the current screen displayed on their device to other users within an online collaboration session. Whiteboard module 733 may be similar to whiteboard service 243 of FIG. 2. Whiteboard module 733 facilitates the user to start a whiteboarding session from their user devices in which a user can share a whiteboard from his/her user device, and his/her actions taken on the whiteboard, with other users. Video module 734 may be similar to video service 244 of FIG. 2. Video module 734 facilitates the user to transition from audio-only participation in the online collaboration session to video conferencing. Invite user module 735 may be similar to invite user service 245 of FIG. 2. Invite user module 735 further facilities the user to invite additional users to join the online collaboration session. Finally, dialer module 736 may be similar to dialer service 246 of FIG. 2. Dialer module 736 facilitates the user to to make calls from within the online collaboration session, and join the user who accepts the call.

Figure 8:
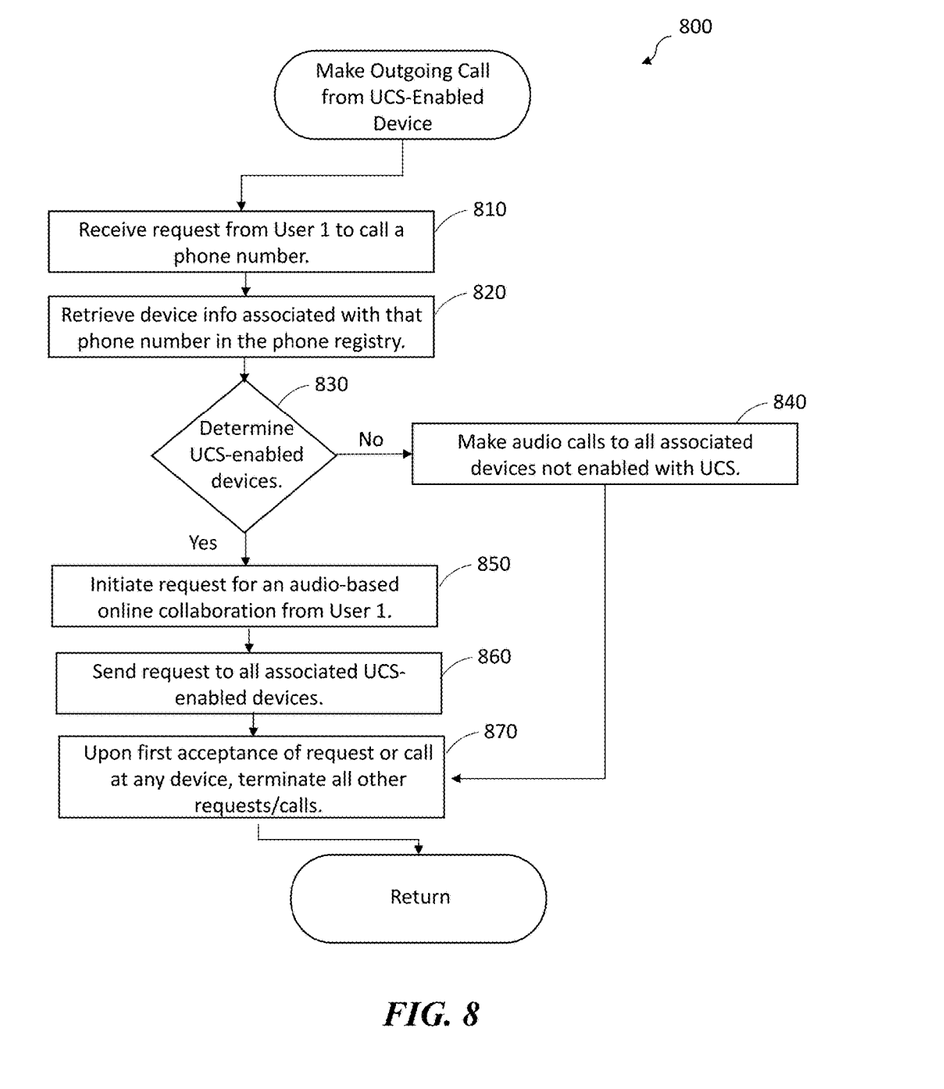
FIG. 8 is a flow diagram of a process of making an outgoing call, consistent with various embodiments.

Turning now to FIG. 8, FIG. 8 is a flow diagram of a process of making an outgoing call from a UCS-enabled device, consistent with various embodiments.

In some embodiments, process 800 may be executed in a system such as system 700 of FIG. 7. At block 810, unified voice module 720 receives a request from User 1 to call a phone number. At block 820, registry module 721 retrieves the device information associated with that phone number in the phone registry. At block 830, unified voice module 720 determines which associated devices are UCS-enabled and which associated devices are not UCS-enabled. At block 840, telephony module 722 makes audio calls from User 1 to all associated devices not enabled with USC. At block 850, online collaboration module 730 initiates requests for an audio-based online collaboration session from User 1. At block 860, online collaboration module 730 sends requests for an audio-based online collaboration session from User 1 to all associated, UCS-enabled devices. Finally, at block 870, upon first acceptance of a request or a call at any device, telephony module 722 in conjunction with online collaboration module 730 terminate all other calls and/or requests.

Figure 9:
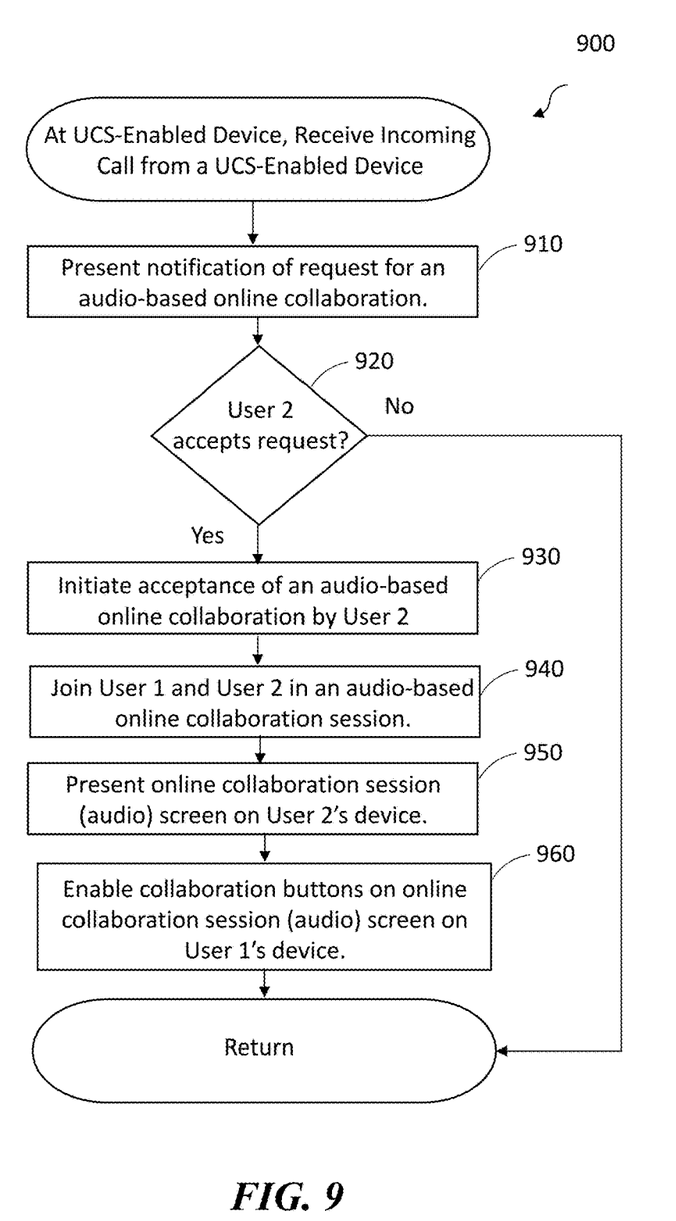
FIG. 9 is a flow diagram of a process of receiving an incoming call, consistent with various embodiments.

Turning now to FIG. 9, FIG. 9 is a flow diagram of a process of receiving an incoming call, which was made from a UCS-enabled device, at a UCS-enabled device, consistent with various embodiments.

In some embodiments, process 900 may be executed in a system such as system 700 of FIG. 7. At block 910, online collaboration module 730 presents a notification to User 2 of a request for an audio-based online collaboration session from User 1. At block 920, online collaboration module 730 receives User 2's acceptance or rejection of request. If accepted, at block 930, online collaboration module 730 initiates acceptance of an audio-based online collaboration session. At block 940, online collaboration module 730 joins User 1 and User 2 in an audio-based online collaboration session. At block 950, online collaboration module 730 presents an online collaboration session (audio) screen to User 2 with the collaboration buttons enabled. Finally, at block 950, online collaboration module 730 enables the collaboration buttons on User 1's online collaboration session (audio) screen.

Example Computer System

Figure 10:
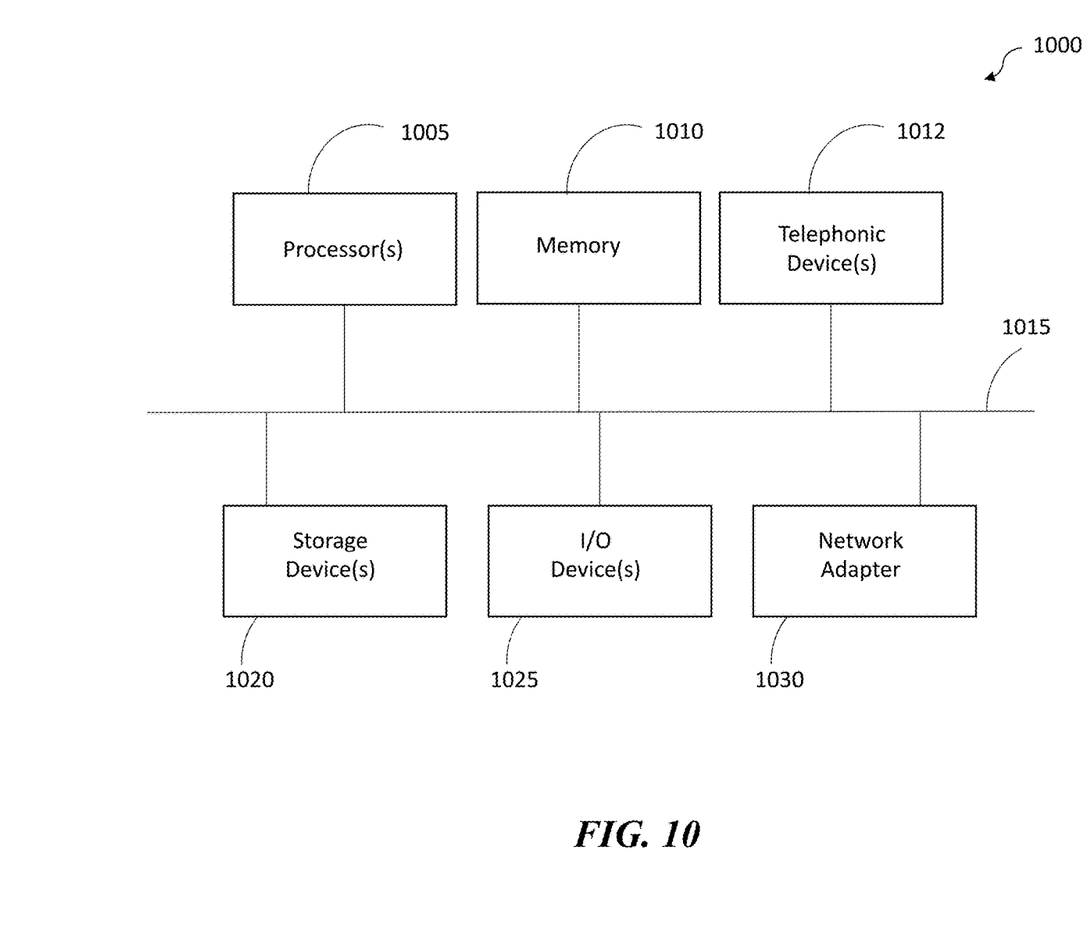
FIG. 10 is a block diagram illustrating components of an apparatus that may perform various operations described by the technology.

Turning now to FIG. 10, FIG. 10 is a block diagram illustrating components of an apparatus that may perform various operations described by the technology.

FIG. 10 is a block diagram of a computer system as may be used to implement features of some embodiments of the disclosed technology. Computing system 1000 may include one or more central processing units ("processors") 1005, memory 1010, telephonic devices 1012 (e.g., traditional telephones, mobile (cellular) phones, smartphones and softphones), input/output devices 1015 (e.g., key-board and pointing devices, and display devices), storage devices 1020 (e.g., disk drives), and network adapters 1030 (e.g., network interfaces) that are connected to an interconnect 1015. The interconnect 2315 is illustrated as an abstraction that represents any one or more separate physical buses, point to point connections, or both connected by appropriate bridges, adapters, or controllers. The interconnect 1015, therefore, may include, for example, a system bus, a Peripheral Component Interconnect (PCI) bus or PCI-Express bus, a Hyper Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1010 and storage devices 1020 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media may include computer-readable media (e.g., "non-transitory" media) and computer-readable transmission media. The instructions stored in memory 1010 may be implemented as software and/or firmware to program the processor(s) 1005 to carry out actions described above. In some embodiments, such software or firmware may be initially provided to the processing system 1000 by downloading it from a remote system through the computing system 1000 (e.g., via network adapter 1030).

Various communications links may be used by the telephonic devices 1012, such as public switched telephone networks, cellular networks, private branch exchange networks, or the Internet.

The technology introduced herein may be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the invention. Accordingly, the invention is not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure in this specification are used to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing may be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, sub-steps may be performed in parallel, illustrated logic may be omitted, other logic may be included, etc.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Furthermore, in the specification, figures and claims, reference is made to particular features (including method steps) of the invention. It is to be understood that the disclosure of the invention includes all possible combinations of such particular features. For example, where a particular feature is disclosed in the context of a particular aspect or embodiment of the invention, or a particular claim, that feature may also be used, to the extent possible, in combination with and/or in the context of other particular aspects and embodiments of the invention.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an article "comprising" (or "which comprises") components A, B and C may consist of (i.e., contain only) components A, B and C, or may contain not only components A, B, and C but also contain one or more other components.

Where reference is made herein to a method comprising two or more defined steps, the defined steps may be carried out in any order or simultaneously (except where the context excludes that possibility), and the method may include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose limit is the second number. For example, 25 to 100 mm means a range whose lower limit is 25 mm and upper limit is 100 mm.

Aspects of the disclosed invention may be embodied as a system, method or process, or computer program product. Accordingly, aspects of the disclosed invention may take the form of an entirely hardware embodiment, an entirely software embodiment (including firmware, resident software, micro-code, etc.) or an embodiment combining software and hardware aspects that may all generally be referred to herein as a "circuit," "module," "program," "device," or "system." Furthermore, aspects of the disclosed invention may take the form of a computer program product embodied in one or more computer readable media having computer readable program code embodied thereon.

Any element in a claim that does not explicitly state "means for" performing a specified function, or "step for" performing a specific function is not to be interpreted as a "means" or "step" clause as specified in 35. U.S.C. § 112 ¶6. Specifically, the use of "step of" in the claims herein is not intended to invoke the provisions of U.S.C. § 112 ¶6.

We claim:

1. A unified communications method comprising:
registering in a phone registry, by a unified communications service executing on a computer system, one or more telephonic devices associated with a user of one or more users, the one or more telephonic devices optionally having an implementation of the unified communications service,
with values for user identifier, device identifier, unified communications service indicator and phone number;
making, by the unified communications service, an outgoing phone call or an online collaboration request, as requested by a caller user, via a telephonic device having an implementation of the unified communications service;
receiving, by the unified communications service, an incoming phone call or an incoming online collaboration request directed to a recipient user via a telephonic device having an implementation of the unified communications service;
joining, by the unified communications service, the caller user and the recipient user in an online collaboration session;
presenting, by the unified communications service, the online collaboration session to at least the caller user and the recipient user; and
executing, by the unified communications service, one of one or more collaboration services of
share file service,
share screen service,
whiteboard service,
video service,
invite user service, or
dialer service.

2. The method of claim 1 wherein making an outgoing phone call includes:
retrieving values, if any, from the phone registry for telephonic devices associated with the outgoing phone call;
determining which telephonic devices, if any, having an implementation of the unified communications service;
making phone calls to any telephonic devices associated with the outgoing phone call not having an implementation of the unified communication service;
sending online collaboration requests to any telephonic devices associated with the outgoing phone call having an implementation of the unified communication service;
terminating, upon first acceptance of any call or request, any other call or request.

3. The method of claim 1 wherein receiving an incoming phone call includes:
IF the recipient user is receiving the incoming phone call THEN
present the recipient user with notification of the incoming phone call;
IF the recipient user accepts the incoming phone call THEN connect the recipient user to the incoming phone call;
ELSE
disconnect the incoming phone call;
ELSE IF the recipient user is receiving the incoming online collaboration request THEN present the recipient user with notification of the incoming online collaboration request;
IF the recipient user accepts the incoming online collaboration request THEN join the caller user and the recipient user in an online collaboration session;
ELSE
disconnect the incoming online collaboration request.

4. A unified communications system comprising:
a processor;
a registration logic configured to registering in a phone registry, by a unified communications service executing on a computer system, one or more telephonic devices associated with a user of one or more users, the one or more telephonic devices optionally having an implementation of the unified communications service,
 with values for user identifier, device identifier, unified communications service indicator and phone number;
a making logic configured to make a phone call or an online collaboration request, as requested by a caller user, via a telephonic device having an implementation of a unified communications service;
a receiving logic configured to receive a phone call or an incoming online collaboration request directed to a recipient user via a telephonic device having an implementation a unified communications service;
a joining logic configured to join a caller user and a recipient user in an online collaboration session;
a presenting logic configured to present an online collaboration session to at least a caller user and a recipient user; and
an executing logic configured to execute one of one or more collaboration services of
 share file service,
 share screen service,
 whiteboard service,
 video service,
 invite user service, or
 dialer service.

5. A non-transitory, computer-readable medium storing program instructions that, when executed by a processor, cause the processor to perform the method of:
 registering in a phone registry, by a unified communications service executing on a computer system, one or more telephonic devices associated with a user of one or more users, the one or more telephonic devices optionally having an implementation of the unified communications service,
 with values for user identifier, device identifier, unified communications service indicator and phone number;
making, by the unified communications service, an outgoing phone call or an online collaboration request, as requested by a caller user, via a telephonic device having an implementation of the unified communications service;
receiving, by the unified communications service, an incoming phone call or an incoming online collaboration request directed to a recipient user via a telephonic device having an implementation of the unified communications service;
joining, by the unified communications service, the caller user and the recipient user in an online collaboration session;
presenting, by the unified communications service, the online collaboration session to at least the caller user and the recipient user; and
executing, by the unified communications service, one of one or more collaboration services of
 share file service,
 share screen service,
 whiteboard service,
 video service,
 invite user service, or
 dialer service.

\* \* \* \* \*